United States Patent
Wang et al.

(10) Patent No.: US 12,519,505 B2
(45) Date of Patent: Jan. 6, 2026

(54) TIME SYNCHRONIZATION FOR WIRELESS DEVICE

(71) Applicant: HEWLETT PACKARD ENTERPRISE DEVELOPMENT LP, Spring, TX (US)

(72) Inventors: Bo Wang, Beijing (CN); Jiguang Zheng, Beijing (CN); Kuanyue Li, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 182 days.

(21) Appl. No.: 18/498,233

(22) Filed: Oct. 31, 2023

(65) Prior Publication Data
US 2025/0141492 A1   May 1, 2025

(51) Int. Cl.
*H04B 1/7073*   (2011.01)
*H04L 7/033*    (2006.01)

(52) U.S. Cl.
CPC ......... *H04B 1/7073* (2013.01); *H04L 7/0331* (2013.01); *H04B 2201/7073* (2013.01)

(58) Field of Classification Search
CPC .......... H04B 1/7073; H04B 2201/7073; H04L 7/0331
See application file for complete search history.

(56) References Cited

U.S. PATENT DOCUMENTS

| | | | |
|---|---|---|---|
| 2017/0093512 A1* | 3/2017 | Zhu | H04B 3/462 |
| 2017/0111073 A1* | 4/2017 | Hajimiri | H02J 50/23 |
| 2021/0258906 A1* | 8/2021 | Kushioka | H04W 56/00 |

OTHER PUBLICATIONS

Schmitz et al. "Distributed software defined radio testbed for real-time emitter localization and tracking," 2017 IEEE International Conference on Communications Workshops (ICC Workshops), Paris, France, 2017 (Year: 2017).*
Haxhibeqiri et al., "Enabling TSN over IEEE 802.11: Low-overhead Time Synchronization for Wi-Fi Clients", 22nd IEEE international conference on industrial technology, 2021, 6 pages.

* cited by examiner

*Primary Examiner* — Sam K Ahn
*Assistant Examiner* — Amneet Singh
(74) *Attorney, Agent, or Firm* — Hewlett Packard Enterprise Patent Department (57) ABSTRACT

A method for time synchronization for wireless device. The method comprises receiving a modulated signal from a second wireless device, the modulated signal indicating information of a first PPS signal for time synchronization, and the first PPS signal being received by the second wireless device via a network protocol for time synchronization or a GNSS receiver. The method further comprises obtaining a second PPS signal by demodulating the received modulated signal. The method further comprises determining a delay offset between the first PPS signal and the second PPS signal. Furthermore, the method further comprises recovering the first PPS signal for time synchronization based on the second PPS signal and the delay offset. In this manner, the accuracy of the time synchronization can be improved, and the cost for the entire network can be reduced.

18 Claims, 8 Drawing Sheets

TIME SYNCHRONIZATION FOR WIRELESS DEVICE

BACKGROUND

Time synchronization between Wi-Fi devices is fundamental for optimizing wireless network performance. With the increasing dependence on Wi-Fi connectivity, precise timing becomes significantly important. In an ideal transmission system, pulses are transmitted at precise intervals and arrive at the receiver at perfectly identical time intervals. In practical systems, various factors contribute to signal imperfections, leading to suboptimal frequency or phase synchronization. Frequency synchronization involves aligning clocks to the same frequency, and phase/time synchronization refers to aligning two devices to the same phase and time of a day.

A pulse per second (PPS) signal is a highly accurate timekeeping signal that generates one electrical pulse at the start of each second. It serves as a reference point for precise timekeeping and synchronization across various applications. PPS signals are typically generated by exceptionally accurate time sources, such as atomic clocks or Global Navigation Satellite System (GNSS) receivers.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

In some traditional schemes, some wireless devices implement time synchronization by using the Global Navigation Satellite System (GNSS) receiver. GNSS receivers utilize signals from global navigation satellite systems such as the Global Positioning System (GPS) to determine their precise location and time. The GNSS receivers should be deployed in strategic locations with clear satellite visibility, so as to acquire satellite signals from the satellites. Then, the GNSS receivers may extract highly accurate time information from the acquired satellite signals, and may share this precise time with wireless devices through wired or wireless networks using standard time distribution protocols like Precision Time Protocol (PTP). Then the wireless devices may adjust their local clocks based on the GNSS-referenced time. However, the GNSS receiver works well in outdoor environments but may fail to receive signals in indoor environments.

In some other traditional schemes, some wireless devices implement time synchronization by using a 1588 protocol (i.e., PTP). To implement time synchronization between wireless devices using the 1588 protocol, all devices in the network should support the 1588 protocol. One device in the wireless network is identified as a master clock, and other devices are identified as slave clocks. Then, these devices exchange timestamped PTP messages over the network, measure the propagation delay, and adjust their local clocks to match the time of the master clock. However, the cost of all devices in the network supporting 1588 protocol is expensive. Furthermore, the delay of the synchronization between wireless devices is around 10 micro seconds. Thus, the accuracy may limit many Wi-Fi 7 and Time Sensitive Network (TSN) related applications.

Therefore, the implementations of the present disclosure provide a scheme of time synchronization between wireless devices. A host wireless device, such as a host access point (AP), may obtain an original pulse per second (PPS) signal, and generate a modulated signal based on the original PPS signal. Then, the host AP may transmit the modulated signal to a client wireless device, such as a client AP.

After receiving the modulated signal, the client AP may demodulate the received modulated signal, and obtain a target PPS signal. The client AP may estimate multiple delays during the process and determine a total delay offset between the original PPS signal and the target PPS signal. Furthermore, the client AP may recover the original PPS signal by compensating the total delay offset to the target PPS signal.

In this way, the wireless devices which cannot receive GPS signals can synchronize their clocks with the host wireless device without supporting PTP protocols. In addition, the accuracy of the time synchronization can be improved, and the cost for the entire network can be reduced.

Figure 1:
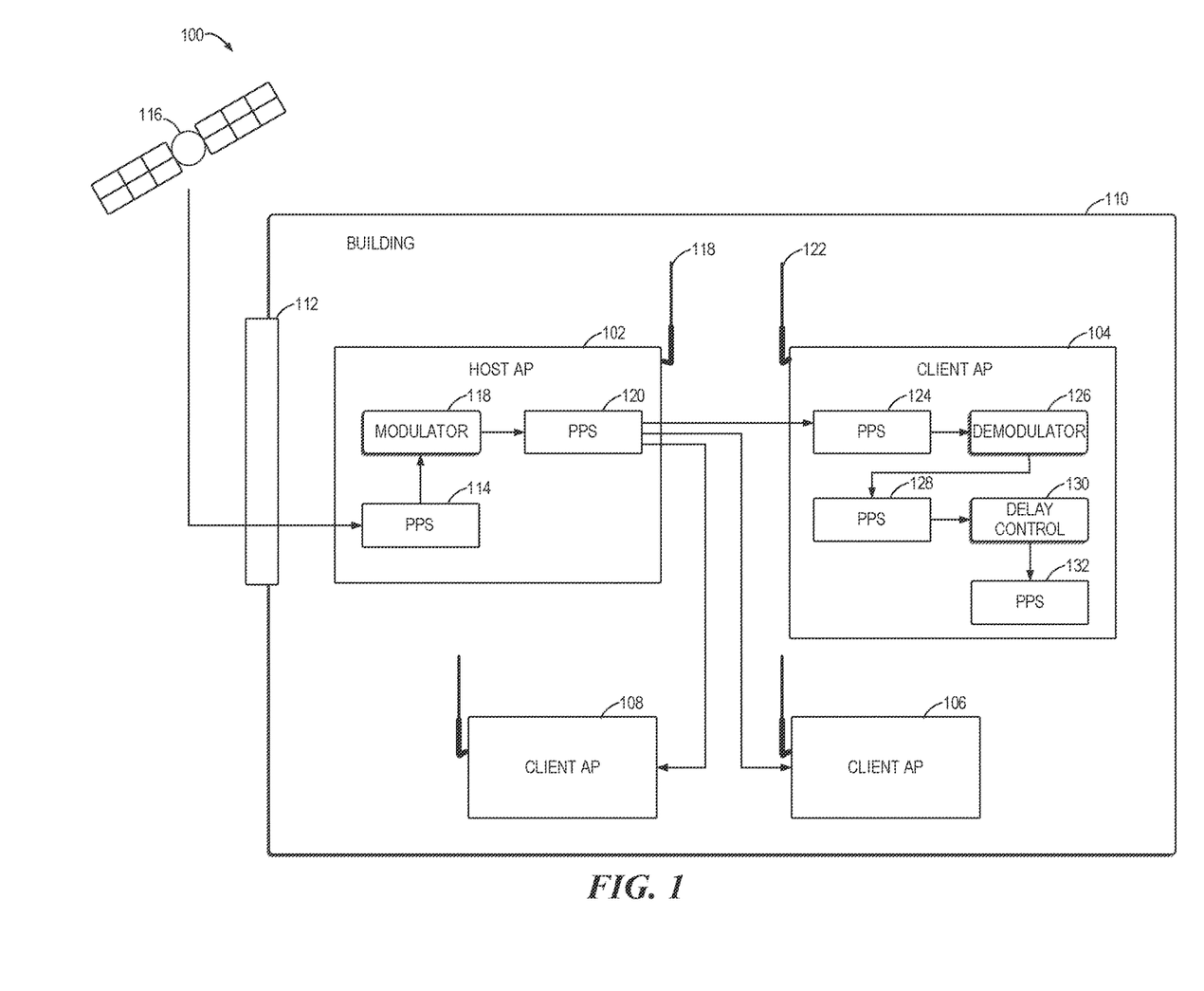
FIG. 1 is a schematic diagram illustrating an example environment in which example implementations of the present disclosure may be implemented.

FIG. 1 is a schematic diagram illustrating an example environment 100 in which example implementations of the present disclosure may be implemented. As shown in FIG. 1, the environment 100 comprises a host AP 102 and three client APs 104, 106 and 108. These APs are deployed in a building 110, where the host AP 102 is close to a window 112 of the building 110 and the client APs 104, 106 and 108 are far away from the window 112. In the environment 100, the host AP 102 may receive a PPS signal 114 which is a precise time signal from a satellite 116 via a GNSS receiver. In some implementations, the host AP 102 may also receive the PPS signal 114 from other devices via a network protocol for time synchronization, such as a 1588 protocol. However, because the client APs are deployed in an indoor environment and far away from the window 112, they cannot receive PPS signals from the satellite 116. Therefore, the host AP 102 may provide a precise time signal (i.e., the PPS signal 114), and the client APs 104, 106, and 108 may synchronize their local time with the host AP 102.

As shown in FIG. 1, the host AP 102 comprises a modulator 118 and an antenna 118. The modulator 118 may modulate the PPS signal 114 into a PPS signal 120. In some implementations of the present disclosure, the modulator 118 may comprise a sine wave generation module configured to produce a sine wave signal. In these implementations, the modulator 118 may further comprise a radio frequency (RF) switch used for generating the modulated PPS signal 120 based on the original PPS signal 114 and the generated sine wave. In the environment 100, after generating the modulated PPS signal 120, the host AP 102 may transmit it to the client APs 104, 106, and 108 for time synchronization among these APs.

As shown in FIG. 1, as an example, the client AP 104 comprises an antenna 122, a demodulator 126 and a delay control unit 130. The modulated PPS 120 may be transmitted in the air and may be received by the antenna 122 of the client AP 104 as a modulated PPS signal 124. The modulated PPS signal 124 may be demodulated by the demodulator 125, so as to obtain a PPS signal 128. Although the client AP 104 has acquired a PPS signal from the host AP 102, the PPS signal 128 cannot yet be used for the time synchronization because there is a delay offset between the original PPS signal 114 acquired from the satellite 116 and the PPS signal 128. For example, the delay offset may be caused by switching the RF switch included in the modulator 118, an envelope detector included in the demodulator 126, and the air propagation of the PPS signal 120 from the antenna 118 of the host AP 102 to the antenna 122 of the client AP 104. Therefore, the client AP 104 may compensate the PPS signal 128 with a delay by utilizing the delay control unit 130. After the delay compensation, the client AP 104 may obtain a PPS signal 132, where the PPS signal 132 has a sub-microsecond level accuracy.

It should be noted that the host AP 102 is an example of a host wireless device, and the client APs 104, 106, and 108 are examples of client wireless devices. The host wireless device and the client wireless device may be other wireless devices, such as a switch, a router, a client, etc.

In this manner, the time of the client wireless device can be synchronized even when the client wireless device is in an environment without GNSS signal. Furthermore, all of the wireless devices in the network do not need to support the PTP protocol, such that the cost of the entire network can be reduced. In addition, the accuracy of the time synchronization can be improved to a sub-microsecond level.

Figure 2:
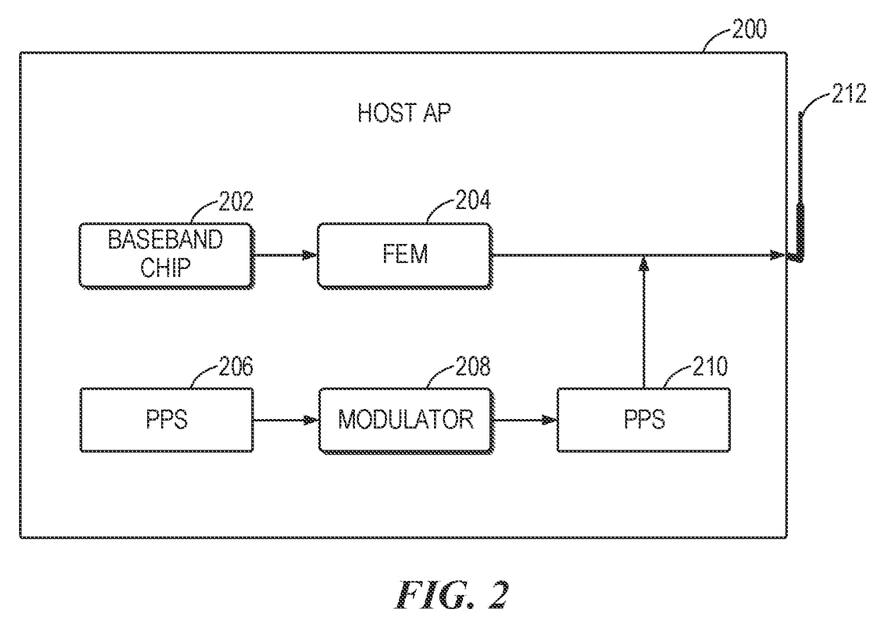
FIG. 2 is a schematic diagram illustrating an example process of generating a modulated signal and transmitting the modulated signal by a host AP according to the implementations of the present disclosure.

FIG. 2 is a schematic diagram illustrating an example process of generating a modulated signal and transmitting the modulated signal by a host AP according to the implementations of the present disclosure. As shown in FIG. 2, a host AP 200 comprises a baseband chip 202, a front-end module (FEM) 204, a modulator 208 and an antenna 212. The baseband chip 202 performs digital signal processing, encoding, and encapsulation of data to generate data frames that conform to the Wi-Fi protocol. The generated Wi-Fi data frames may be transmitted from the baseband chip 202 to the FEM 204. Then, the FEM 204 may convert the digital signals into RF signals (i.e., Wi-Fi signals) and modulates the signals to fit into the RF frequency bands for Wi-Fi communication. Furthermore, the FEM 204 may also amplify the RF signals to ensure that the signals have sufficient power to be transmitted in the Wi-Fi channel with a coverage range needed for communication between devices.

The host AP 200 may obtain an original PPS signal 206 from trusted time sources, for example, GNSS receivers, atomic clocks, network time servers, precise time devices, satellite ground stations, etc. The modulator 208 in the host AP 200 may modulate the PPS signal 206 into a modulated PPS signal 210. Then, the modulated PPS signal 210 may be combined with the Wi-Fi signal generated by the FEM 204. Then, the modulated PPS signal 210 and the Wi-Fi signal may be transmitted to a client AP (e.g., the client AP 104 in FIG. 1) by the antenna 212.

In this manner, the modulator 208 is connected to the signal transport path between the FEM 204 and the antenna 212. Therefore, the modulator 208 does not affect the transmission of the Wi-Fi signal over the original link of the host AP 200.

Figure 3:
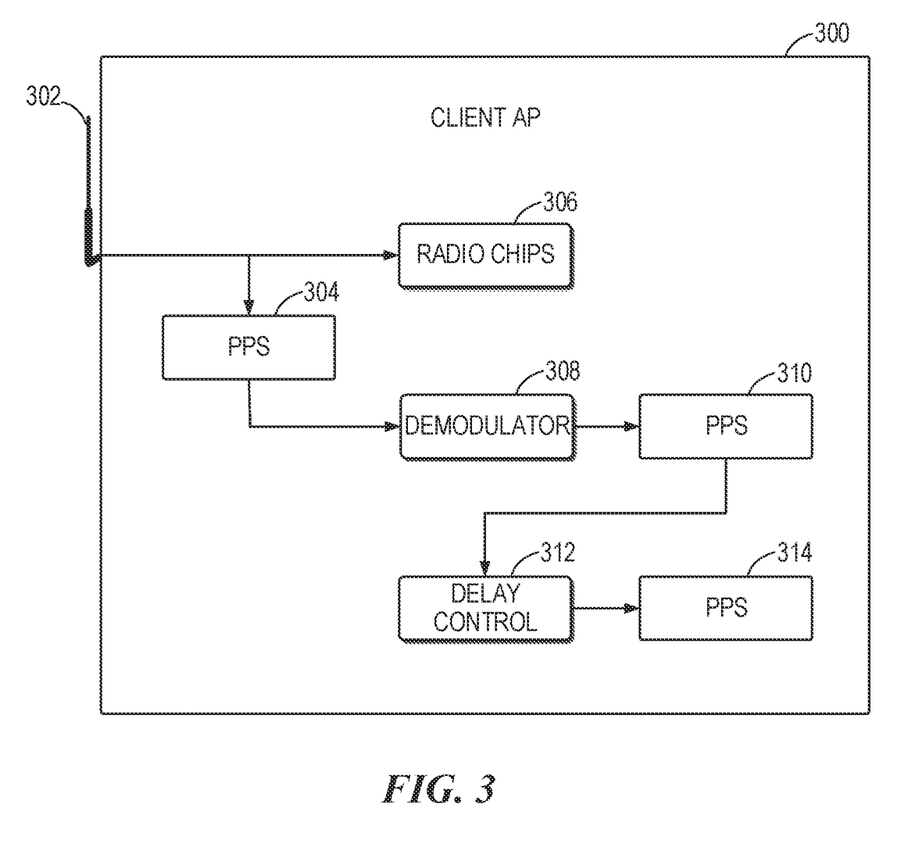
FIG. 3 is a schematic diagram illustrating an example process of recovering the received modulated signal by a client AP according to the implementations of the present disclosure.

FIG. 3 is a schematic diagram illustrating an example process of recovering the received modulated signal by a client AP according to the implementations of the present disclosure. As shown in FIG. 3, a client AP 300 comprises an antenna 302, radio chips 306, a demodulator 308, and a delay control unit 312. The antenna 302 may receive a modulated PPS signal 304 and a Wi-Fi signal. The Wi-Fi signal may be transmitted to the radio chips 306, and the radio chip receives the Wi-Fi signal and converts it back into a digital signal. This process includes RF demodulation and digital signal processing.

As shown in FIG. 3, the received modulated PPS signal 304 may be transmitted to the demodulator 308. The demodulator 308 may generate a PPS signal 310 by demodulating the modulated PPS signal 304. In some implementations, the demodulator 308 may comprise a filter, an amplitude modulation module and an envelope detector. The filter may be used for filtering the Wi-Fi signal from the modulated PPS signal, and the amplitude modulation module and the envelope detector may be used for demodulating the RF signal into the PPS signal 310.

As shown in FIG. 3, the PPS signal 310 may be transmitted to the delay control unit 312. The delay control unit 312 may estimate multiple delays during the previous process and determine a total delay offset between the original PPS signal of the host AP (e.g., the PPS signal 206 of the host AP 200) and the PPS signal 310. In some implementations, the delay control unit 312 may comprise a timer and a counter being used for compensating the delay to the PPS signal 310. Then, the delay control 312 may generate a compensated PPS signal 314, where the compensated PPS signal 314 only has sub-micro second level delay with the original PPS signal of the host AP. Therefore, the time of the client AP 300 may be synchronized with the time of the host AP.

As shown in FIG. 3, the demodulator 308 is connected to the antenna 302, and the delay control unit 312 is connected to the demodulator 308. In this manner, the demodulator 308 and the delay control unit 312 do not affect the transmission of the Wi-Fi signal over the original link of the client AP 300.

Figure 4:
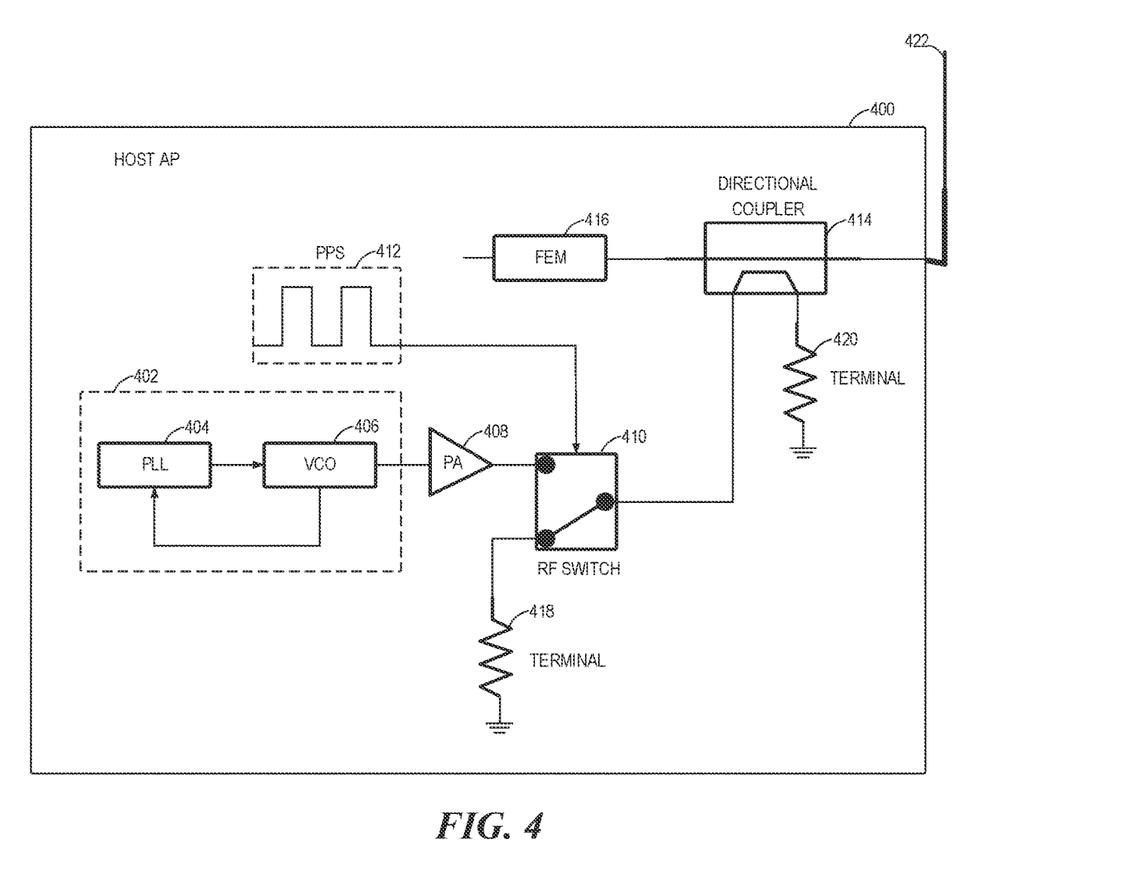
FIG. 4 is a schematic diagram illustrating an example host AP according to the implementations of the present disclosure.

FIG. 4 is a schematic diagram illustrating an example host AP 400 according to the implementations of the present disclosure. As shown in FIG. 4, the host AP 400 comprises a sine wave generation module 402, which is used for generating a sine wave signal. In some implementations, the sine wave generation module 402 comprises a phase-locked loop (PLL) 404 and a voltage-controlled oscillator (VCO) 406. The VCO 406 may output a signal with a fixed frequency. Then, this signal may be fed back to the PLL 404. The fed-back signal is fractionally divided and then compared to the input signal of the PLL 404, and the two signals are aligned. As a result, the sine wave generation module 402 may generate a sine wave signal with a specific frequency, where the specific frequency may be away from the frequency of the Wi-Fi signal and comply with regulations. In some implementations, a difference between the frequency of the sine wave signal and the frequency of the Wi-Fi signal of the host AP 400 is greater than a predefined difference. In this manner, because the frequency of the modulated signal is away from the Wi-Fi frequency, the normal traffic or services will not be impacted by introducing the modulator and the demodulator.

As shown in FIG. 4, the sine wave generation module 402 is connected to a power amplifier 408. Thus the generated sine wave signal may be transmitted to the power amplifier 408. The power amplifier 408 is configured to amplify the power of the sine wave signal. In the host AP 400, the power amplifier 408 is connected to an RF switch 410, and the sine wave signal may be transmitted to the RF switch 410. The RF switch 410 may be controlled by the original precise PSS signal 412. If the RF switch 410 detected a rising edge (or a high level) of the original PPS signal 412, the status of the RF switch 410 may be changed to cause the sine wave signal to pass through the RF switch 410. Otherwise, if the RF switch 410 detected a falling edge (or a low level) of the original PPS signal 412, the status of the RF switch 410 may be changed to cause the sine wave signal to be blocked by the RF switch 410. As a result, the demodulator may output a modulated PPS signal, and the modulated PPS signal may be transmitted to a directional coupler 414. In addition, the RF switch 410 may also be connected to a terminal 418. The terminal 418 is used for absorbing matching loads of the RF switch 410.

As shown in FIG. 4, the RF switch 410 is connected to the directional coupler 414. The directional coupler 414 has four ports, and they are connected to a FEM 416, an antenna 422, the RF switch 410, and a terminal 420. The FEM 416 may generate the Wi-Fi signal of the host AP 400, and the terminal 420 may be used to absorb matching loads. The directional coupler 414 may be used to couple the modulated PPS signal with the Wi-Fi signal generated by the FEM 416. Then, the modulated PPS signal and the Wi-Fi signal may be transmitted to client APs through the antenna 422 of the host AP 400. In the process of generating the modulated PPS signal, the switching of the RF switch 410 may introduce a delay in the modulated PPS signal. This delay can be estimated, and typically it is about 10 ns, which means that compared to the original precise PPS signal, the modulated PPS signal has about 10 ns delay.

In this manner, the original PPS signal of the host AP 400 can be modulated and transmitted to client APs by using hardware. Furthermore, the delay between the modulated PPS signal and the original precise PPS signal can be estimated. Therefore, the delay can be compensated, and the accuracy of the time synchronization can be improved.

Figure 5:
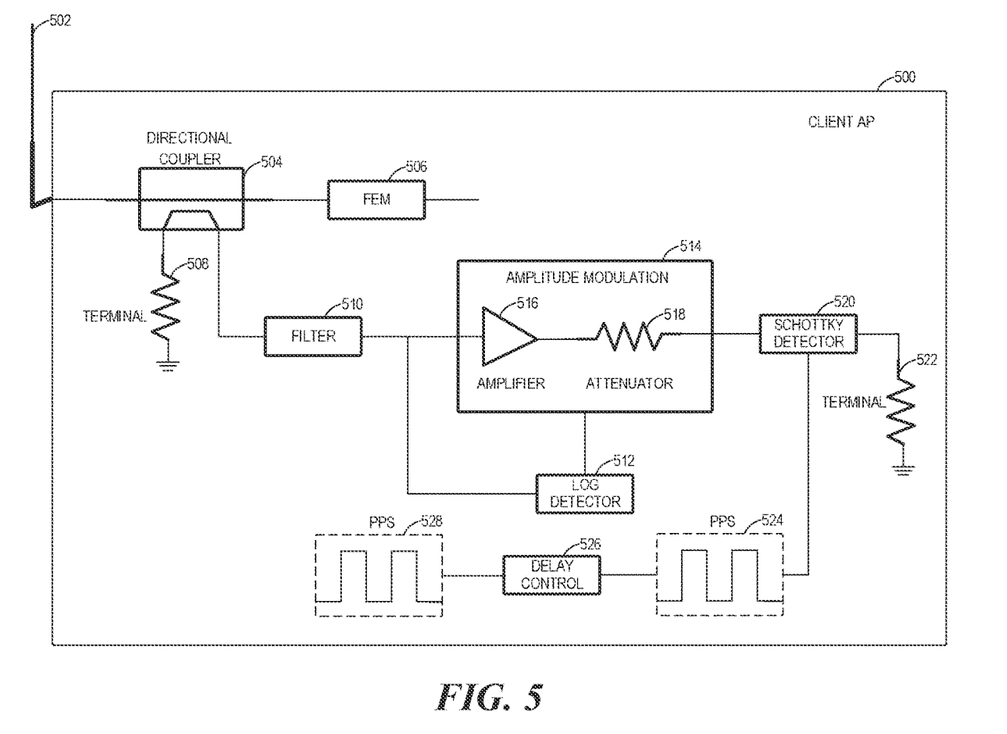
FIG. 5 is a schematic diagram illustrating an example client AP according to the implementations of the present disclosure.

FIG. 5 is a schematic diagram illustrating an example client AP 500 according to the implementations of the present disclosure. As shown in FIG. 5, an antenna 502 of the client AP 500 may receive a modulated PPS signal from a host AP (e.g., the host AP 400 in FIG. 4), and the modulated PPS signal indicates information of an original precise PPS signal for time synchronization between the host AP and the client AP 500. In the client AP 500, a directional coupler 504 is connected to the antenna 502 and configured to assign the received modulated PPS signal to a FEM 506 and a filter 510. Furthermore, a terminal 508 is connected to the directional coupler 504 and configured to absorb matching signals. In the client AP 500, the FEM 506 is connected to the directional coupler 504 to process the Wi-Fi signal portion of the received modulated PPS signal.

As shown in FIG. 5, the filter 510 is connected to the directional coupler 504 and configured to obtain a filtered signal indicating the information of the original PPS signal (e.g., the original PPS signal 412 in the host AP 400) by filtering the Wi-Fi signal from received modulated PPS signal. Furthermore, the filter 510 may also remove other interference signals from the received modulated PPS signal. In the client AP 500, an amplitude modulation module 514 is connected to the filter 510 and configured to generate an adjusted signal based on the filtered signal by adjusting the amplitude of the filtered signal, so as to make the adjusted amplitude of the filtered signal meet an optimal detection level of an envelope detector, i.e., the Schottky detector 520. Therefore, the amplitude of the signal inputted to the Schottky detector 520 would not be too large or too small.

In the implementation as shown in FIG. 5, the amplitude modulation module 514 comprises an amplifier 516 connected to the filter 510 and an attenuator 518 connected to the amplifier 516. In order to adjust the parameters of the amplifier 516 and the attenuator 518, a demodulation log detector 512 may be connected to a branch between the filter 510 and the amplitude modulation module 514. The log detector 512 has a high detection sensitivity. Thus, it can be used to detect weak signals. Therefore, the filtered signal may be transmitted to the log detector 512, and the log detector 512 may detect the signal (even when the signal is weak) and adjust the parameters of the amplifier 516 and the attenuator 518. As shown in FIG. 5, although the signal detection of the log detector 512 may spend some time, however, there is a path between the filter 510 and the amplitude modulation module 514. In this manner, the filtered signal can be transmitted to the amplitude modulation module 514 directly and the log detector 512 would not introduce a delay offset into the PPS signal. In some implementations, the log detector 512 may be replaced by other suitable detectors, but a log detector is preferred because of its high detection sensitivity.

As shown in FIG. 5, the Schottky detector 520 is connected to the amplitude modulation module 514 and configured to generate a demodulated PPS signal 524. Furthermore, a terminal 522 is connected to the Schottky detector 520 and configured to absorb matching loads of the Schottky detector 520. The Schottky detector 520 is employed to convert high-frequency signals into direct current (DC) signals for subsequent processing, and it relies on the nonlinear characteristics of a Schottky diode. When the diode is forward-biased, it allows a certain level of conduction current to flow. In contrast, when the diode is reverse-biased, it may be changed to a cutoff state. Due to the nonlinear properties of the diode, when the envelope of a high-frequency signal enters the diode, the diode may produce an extremely small DC voltage, the magnitude of which is directly proportional to the intensity of the signal. In this manner, the Schottky detector 520 can effectively convert high-frequency signals into DC signals.

In some implementations, the Schottky detector 520 may be configured to detect the adjusted signal from the amplitude modulation module 514. In some implementations, the Schottky detector 520 may be replaced by other envelope detectors, for example, a log detector or a root mean square (RMS) detector. However, a Schottky detector is preferred because the delay of the Schottky detector is about 10 ns, which is smaller than the log detector and the RMS detector. In this manner, the delay caused by the Schottky detector 520 is small and can be estimated. Therefore, this delay can be compensated, and the accuracy of the time synchronization can be improved.

As shown in FIG. 5, the Schottky detector 520 may generate the demodulated PPS signal 524, and the demodulated PPS signal 524 may be transmitted to a delay control unit 526. The delay control unit 526 is connected to the demodulator (e.g., the Schottky detector 520) and configured to determine a delay offset between the original precise PPS signal (e.g., the original PPS signal 412 in FIG. 4) and the demodulated PPS signal 524. Furthermore, the delay control unit 526 is further configured to recover the original PPS signal based on the demodulated PPS signal 524 and the determined delay offset. In some implementations, the delay control unit 526 may comprise a delay determination module configured to determine a delay caused by switching the RF switch in the host AP (e.g., the RF switch 410 in the host AP 400). In some implementations, the delay control unit 526 may further determine a delay caused by a signal detection process of the envelope detector in the client AP (e.g., the Schottky detector 520 in the client AP 500). In some implementations, the delay control unit 526 may further determine a delay caused by an air propagation of the modulated PPS signal from the host AP to the client AP. Therefore, the delay control unit 526 may determine the delay offset between the original precise PPS signal and the demodulated PPS signal 524 based on these delays, so as to generate a recovered PPS signal 528, where the recovered PPS signal 528 may have a sub-microsecond level delay offset comparing to the original precise PPS signal.

In some implementations, in order to compensate the delay offset, the delay control unit 526 may comprise a counter connected to the demodulator and configured to generate pulse edges of the recovered first PPS signal based on the delay offset. In some implementations, the delay control unit 526 may obtain a default value of a counter for generating a pulse edge of the recovered PPS signal 528. Furthermore, the delay control unit 526 may determine a compensated value of the counter based on the default value and the delay offset, where the compensated value is less than the default value. Then, the delay control unit 526 may generate the pulse edge of the recovered PPS signal 528 based on the compensated value of the counter. For example, if the counter generates a rising edge every C clock cycles, each clock cycle is t (ns), and the delay offset is D (ns), then the counter may generate the next rising edge after C-D/t cycles.

In this manner, the client AP 500 can obtain a recovered PPS signal 528 from a received modulated PPS signal. Furthermore, because the delay in the demodulator can be estimated, the delay offset between the recovered PPS signal 528 and the original precise PPS signal in the host AP can be reduced to a sub-microsecond level. Thus, the accuracy of the time synchronization between the host AP and the client AP can be improved.

Figure 6:
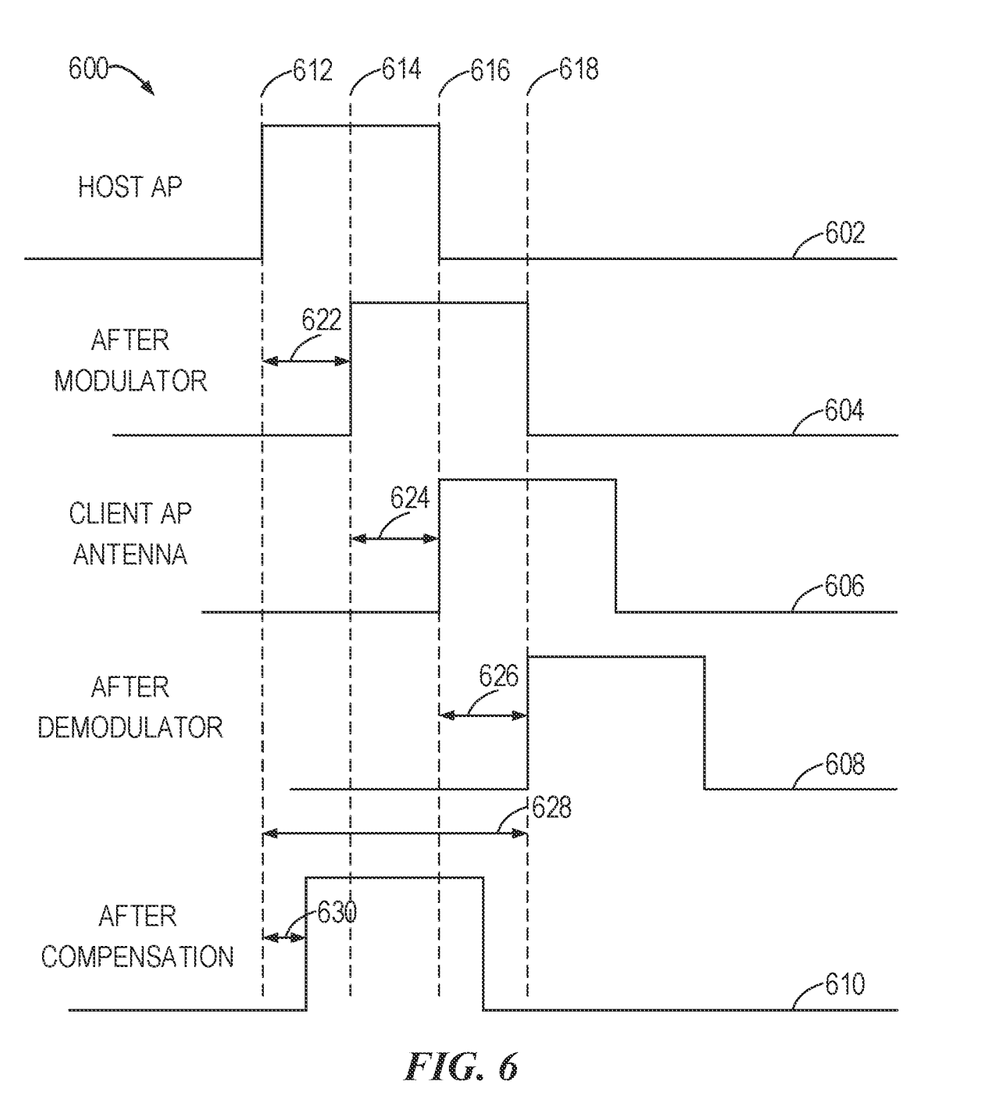
FIG. 6 is a schematic diagram illustrating an example of delay compensation performed by the client AP according to the implementations of the present disclosure.

FIG. 6 is a schematic diagram illustrating an example 600 of delay compensation performed by the client AP according to the implementations of the present disclosure. As shown in FIG. 6, an original PPS signal 602 (e.g., the original PPS signal 114 in the FIG. 1) is received by a host AP (e.g., the host AP 102 in FIG. 1), and a rising edge of the original PPS signal 602 occurs at time 612. Then, the original PPS signal 602 may be modulated into a modulated PPS signal 604 (e.g., the modulated PPS signal 120 in FIG. 1). Because the modulator (e.g., the modulator 118) in the host AP may utilize an RF switch to generate the modulated PPS signal 604 and the switching process of the RF switch may spend some time, the rising edge of the modulated PPS signal 604 is delayed to the time 614, such that there is a delay 622 between the time 612 and the time 614.

The modulated PPS signal 604 may be transmitted by the host AP to a client AP (e.g., the client 104 in FIG. 1), and be received by an antenna of the client AP (e.g., the antenna 122 of the client AP 104 in FIG. 1) as a modulated PPS signal 606. Because the air propagation of the modulated PPS signal may take some time, the rising edge of the modulated PPS signal 606 is delayed to the time 616, such that there is a delay 624 between the time 614 and the time 616.

The modulated PPS signal 606 may be demodulated by a demodulator in the client AP, and the demodulator may generate the demodulated PPS signal 608 (e.g., the demodulated PPS signal 128 in FIG. 1) based on a detection result of an envelope detector. Because the detection process of the envelope detector may take some time, the rising edge of the demodulated PPS signal 608 is delayed to the time 618, such that there is a delay 628 between the time 616 and the time 618.

As shown in FIG. 6, as a result, there is a total delay 628 between the rising edge of the demodulated PPS signal 608 and the original precise PPS signal 602. In some implementations, the delay control unit in the client AP may determine the total delay 628 by estimating the delay 622, the delay 624, and the delay 626. In some implementations, the delay 622 caused by the RF switch may be measured and estimated as a predefined value (e.g., 10 ns). In some implementations, the delay 624 caused by the air propagation may be estimated as a predefined value based on an average distance between APs in an indoor environment. In some implementations, considering the longest distance between APs or an AP and a client is within 100 m, the delay 624 may be estimated as a small predefined value or zero. In some implementations, the delay 626 caused by a Schottky detector may be measured and estimated as 10 ns. After a delay compensation, a recovered PPS signal 610 is very close to the original precise PPS signal 602, and the delay 630 between the rising edge of the recovered PPS signal 610 and the original PPS signal 602 may be less than one microsecond.

In this manner, the delay offset between the demodulated PPS signal and the original precise PPS signal can be measured or estimated, such that this delay offset can be compensated. Therefore, the accuracy of the time synchronization between the host AP and the client AP can be improved.

Figure 7:
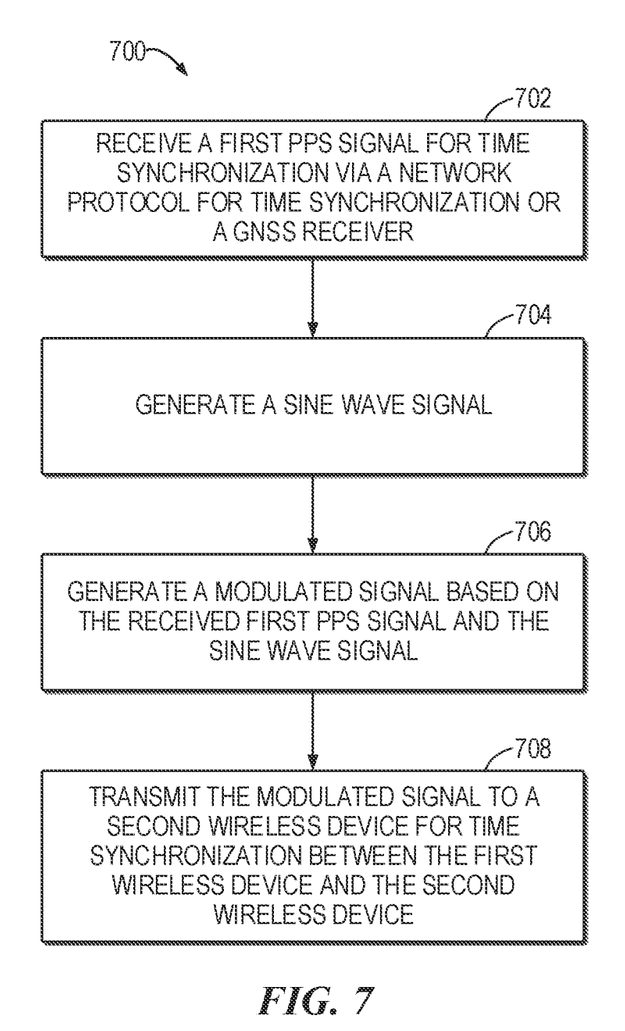
FIG. 7 is a flow chart illustrating a method, performed by a host wireless device, for time synchronization according to the implementations of the present disclosure.

FIG. 7 is a flow chart illustrating a method 700, performed by a host wireless device, for time synchronization according to the implementations of the present disclosure. As shown in FIG. 7, at block 702, the host wireless device may receive a first PPS signal for time synchronization via a network protocol for time synchronization or a GNSS receiver. For example, in the environment 100 as shown in FIG. 1, the host AP 102, which is close to the window 112 of the building 110, may receive an original PPS signal 114 from the satellite 116.

At block 704, the host wireless device may generate a sine wave signal. For example, in the environment 100 as shown in FIG. 1, the modulator 118 of the host AP 102 may generate a sine wave signal. The sine wave signal may be used to modulate the original PPS signal 114.

At block 706, the host wireless device may generate a modulated signal based on the received first PPS signal and the sine wave signal by utilizing an RF switch. For example, in the environment 100 as shown in FIG. 1, the modulator 118 of the host AP 102 may generate the modulated PPS signal 120 based on the original PPS signal 114 and the generated sine wave signal.

At block 708, the host wireless device may transmit the modulated signal to a client wireless device for time synchronization between the host wireless device and the client wireless device. For example, in the environment 100 as shown in FIG. 1, the host AP 102 may transmit the modulated signal 120 to the client AP 104 for time synchronization through the antenna 118 of the host AP 102.

In this manner, the original PPS signal of the host wireless device can be modulated and transmitted to client wireless devices by using hardware. Furthermore, the delay between the modulated signal and the first PPS signal can be measured or estimated. Therefore, the delay can be compensated, and the accuracy of the time synchronization can be improved.

Figure 8:
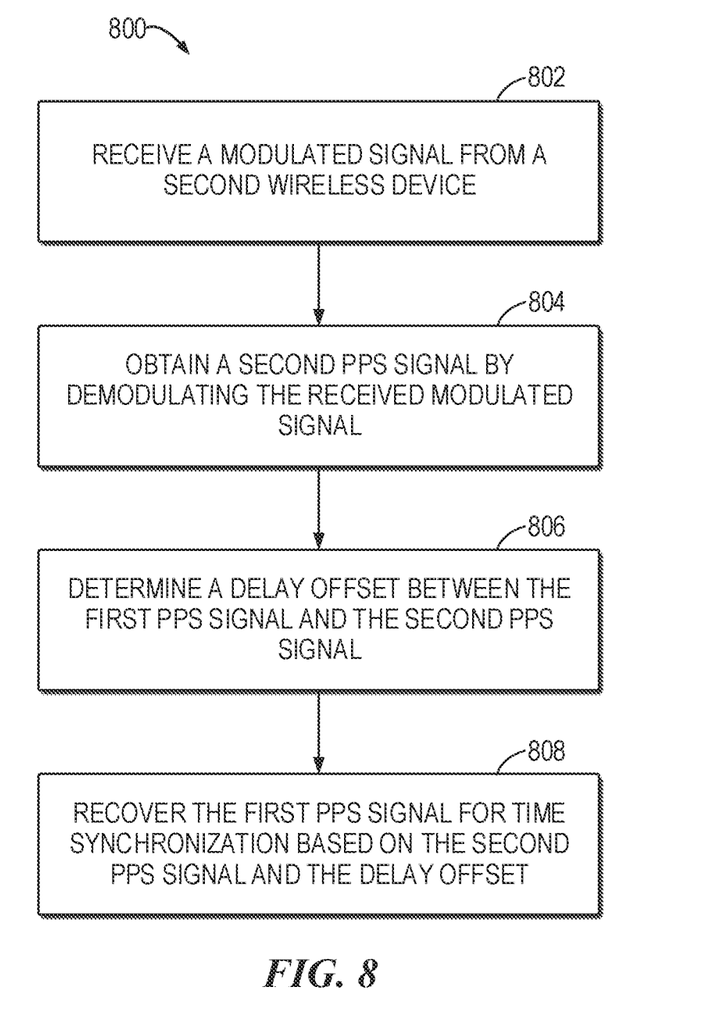
FIG. 8 is a flow chart illustrating a method, performed by a client wireless device, for time synchronization according to the implementations of the present disclosure.

FIG. 8 is a flow chart illustrating a method 800, performed by a client wireless device, for time synchronization according to the implementations of the present disclosure. As shown in FIG. 8, at block 802, the client wireless device may receive a modulated signal from a host wireless device, where the modulated signal indicates information of a first PPS signal for time synchronization, and the first PPS signal is received by the second wireless device via a network protocol for time synchronization or a GNSS receiver. For example, in the environment 100 as shown in FIG. 1, the client AP 104 may receive the modulated PPS signal 124 through the antenna 122 of the client AP 104, where the modulated PPS signal 124 is corresponding to the modulated PPS signal 120.

At block 804, the client wireless device may obtain a second PPS signal by demodulating the received modulated signal. For example, in the environment 100 as shown in FIG. 1, the demodulator 126 in the client AP 104 may receive and demodulate the modulated PPS signal 124. Therefore, the client AP 104 may obtain the demodulated PPS signal 128.

At block 806, the client wireless device may determine a delay offset between the first PPS signal and the second PPS signal. For example, in the environment 100 as shown in FIG. 1, the delay control unit 130 may determine a delay offset between the original PPS signal 114 and the demodulated PPS signal 128. For example, the delay offset may be caused by an RF switch in the host AP 102, an air propagation of the modulated PPS signal 120, or a detection process of an envelope detector in the demodulator 126.

At block 808, the client wireless device may recover the first PPS signal for time synchronization based on the second PPS signal and the delay offset. For example, in the environment 100 as shown in FIG. 1, the client AP 104 may recover the original PPS signal 114 based on the demodulated PPS signal 128 and the delay offset. Then, the recovered PPS signal 132 may be generated. The recovered PPS signal will be very close to the original PPS signal 114, and a final delay offset between these two signals can be reduced to a sub-microsecond level.

In this manner, the client wireless device can obtain a recovered PPS signal from a received modulated PPS signal. Furthermore, because the delay in the demodulator can be estimated, the delay offset between the recovered PPS signal and the original precise PPS signal in the host wireless device can be reduced to a sub-microsecond level. Thus, the accuracy of the time synchronization between the host wireless device and the client wireless device can be improved.

In the context of this disclosure, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable subcombination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   receiving, by a first wireless device, a modulated signal from a second wireless device, the modulated signal indicating information of a first pulse per second (PPS) signal for time synchronization, and the first PPS signal being received by the second wireless device via a network protocol for time synchronization or a Global Navigation Satellite System (GNSS) receiver;
   obtaining, by the first wireless device, a second PPS signal by demodulating the received modulated signal, wherein obtaining the second PPS signal by demodulating the received modulated signal comprises:
      obtaining a filtered signal indicating the information of the first PPS signal by filtering a Wi-Fi signal from the received modulated signal; and
      generating the second PPS signal based on the filtered signal;
   determining, by the first wireless device, a delay offset between the first PPS signal and the second PPS signal; and
   recovering, by the first wireless device, the first PPS signal for time synchronization based on the second PPS signal and the delay offset.

2. The method of claim 1, wherein generating the second PPS signal based on the filtered signal comprises:
   generating an adjusted signal based on the filtered signal by adjusting an amplitude of the filtered signal, the adjusted amplitude of the filtered signal meeting a detection level of an envelope detector; and
   generating the second PPS signal based on the adjusted signal by utilizing the envelope detector.

3. The method of claim 2, wherein generating the adjusted signal based on the filtered signal by adjusting the amplitude of the filtered signal comprises:
   adjusting parameters of an amplifier and an attenuator based on the filtered signal by utilizing a demodulation log detector; and
   adjusting the amplitude of the filtered signal by utilizing the amplifier and the attenuator.

4. The method of claim 2, wherein generating the second PPS signal based on the adjusted signal by utilizing the envelope detector comprises:

outputting a high voltage in response to detecting the adjusted signal by the envelope detector; and outputting a low voltage in response to not detecting the adjusted signal by the envelope detector.

5. The method of claim 2, wherein the envelope detector is a Schottky detector.

6. The method of claim 2, wherein determining the delay offset between the first PPS signal and the second PPS signal comprises:

determining a first delay caused by switching of a radio frequency (RF) switch in the second wireless device, the RF switch being used for generating the modulated signal based on the first PPS signal; and determining the delay offset between the first PPS signal and the second PPS signal based on the first delay.

7. The method of claim 6, wherein determining the delay offset between the first PPS signal and the second PPS signal based on the first delay comprises:

determining a second delay caused by the envelope detector; and determining the delay offset between the first PPS signal and the second PPS signal based on the first delay and the second delay.

8. The method of claim 7, wherein determining the delay offset between the first PPS signal and the second PPS signal based on the first delay and the second delay comprises:

determining a third delay caused by an air propagation of the modulated signal from the second wireless device to the first wireless device; and determining the delay offset between the first PPS signal and the second PPS signal based on the first delay, the second delay and the third delay.

9. The method of claim 1, wherein recovering the first PPS signal for time synchronization based on the second PPS signal and the delay offset comprises:

obtaining a first value of a counter for generating a pulse edge of the recovered first PPS signal;

determining a second value of the counter based on the first value and the delay offset, the second value being less than the first value; and generating the pulse edge of the recovered first PPS signal based on the second value of the counter.

10. A first wireless device comprising:

an antenna configured to receive a modulated signal from a second wireless device, the modulated signal indicating information of a first pulse per second (PPS) signal for time synchronization, and the first PPS signal being received by the second wireless device via a network protocol for time synchronization or a Global Navigation Satellite System (GNSS) receiver;

a directional coupler connected to the antenna and configured to assign the received modulated signal;

a demodulator connected to the directional coupler and configured to demodulate the received modulated signal into a second PPS signal, wherein the demodulator comprises:

a filter connected to the directional coupler and configured to obtain a filtered signal indicating the information of the first PPS signal by filtering a Wi-Fi signal from the received modulated signal; and a demodulation module connected to the filter and configured to generating the second PPS signal based on the filtered signal;

a delay control unit connected to the demodulator and configured to determine a delay offset between the first PPS signal and the second PPS signal; and recover the first PPS signal for time synchronization based on the second PPS signal and the delay offset.

11. The first wireless device of claim 10, wherein the demodulation module comprises:

an amplitude modulation module connected to the filter and configured to generate an adjusted signal based on the filtered signal by adjusting an amplitude of the filtered signal; and an envelope detector connected to the amplitude modulation module and configured to detect the adjusted signal which is used to generate the second PPS signal, wherein the adjusted amplitude of the filtered signal meeting a detection level of an envelope detector.

12. The first wireless device of claim 11, wherein the amplitude modulation comprises:

an amplifier connected to the filter and an attenuator connected to the amplifier configured to adjusting the amplitude of the filtered signal; and a demodulation log detector connected between the filter and the amplitude modulation module and configured to adjust parameters of the amplifier and the attenuator based on the filtered signal.

13. The first wireless device of claim 11, wherein the envelope detector is a Schottky detector, and the demodulator is further configured to:

output a high voltage in response to detecting the adjusted signal by the Schottky detector; and output a low voltage in response to not detecting the adjusted signal by the Schottky detector.

14. The first wireless device of claim 11, wherein the delay control unit comprises:

a counter connected to the demodulator and configured to generate pulse edges of the recovered first PPS signal based on the delay offset; and a delay determination module connected to the counter and configured to determine the delay offset between the first PPS signal and the second PPS signal.

15. The first wireless device of claim 14, wherein the delay determination module is further configured to:

determining the delay offset between the first PPS signal and the second PPS signal based on at least one of:

a first delay caused by switching of a radio frequency switch being used for generating the modulated signal based on the first PPS signal in the second wireless device, a second delay caused by the envelope detector, and a third delay caused by an air propagation of the modulated signal from the second wireless device to the first wireless device.

16. A second wireless device comprising:

a signal generation module configured to generate a sine wave signal;

a power amplifier connected to the signal generation module and configured to amplify a power of the sine wave signal;

a radio frequency (RF) switch connected to the power amplifier and configured to:

receive a first pulse per second (PPS) signal for time synchronization via a network protocol for time synchronization or a Global Navigation Satellite System (GNSS) receiver, and generate a modulated signal based on the received first PPS signal and the sine wave signal;

a directional coupler connected to the RF switch and configured to couple the modulated signal with a Wi-Fi signal;

an antenna connected to the directional coupler and configured to transmit the modulated signal to the second wireless device for time synchronization between a first wireless device and the second wireless device.

17. The second wireless device of claim 16, wherein the signal generation module comprises:

a voltage-controlled oscillator (VCO) connected to the power amplifier; and a phase-locked loop (PLL) connected to the VCO, wherein the VCO and the PLL are configured to generate the sine wave signal, and a difference between a frequency of the sine wave signal and a frequency of the Wi-Fi signal of the second wireless device is greater than a predefined difference.

18. The second wireless device of claim 16, wherein the RF switch is further configured to:

cause the sine wave signal to pass through the RF switch in response to detecting a rising edge of the first PPS signal; and block the sine wave signal in response to detecting a falling edge of the first PPS signal.

* * * * *